United States Patent [19]
Czyzewski

[11] Patent Number: 5,954,394
[45] Date of Patent: Sep. 21, 1999

[54] AIRPLANE SEAT ASSEMBLY HAVING BEVERAGE CUP HOLDER

[76] Inventor: Thaddeus Czyzewski, 800 Burr Rd., San Antonio, Tex. 78209

[21] Appl. No.: 08/767,370

[22] Filed: Dec. 16, 1996

[51] Int. Cl.⁶ ........................................................ A47C 7/70
[52] U.S. Cl. ................................ 297/188.05; 248/311.2; 248/278.1; 297/146; 297/162
[58] Field of Search ............................... 297/146, 155, 297/162, 188.04, 188.05; 248/311.2, 228.1

[56] References Cited

U.S. PATENT DOCUMENTS

| | | | |
|---|---|---|---|
| 3,212,814 | 10/1965 | Anderson | 297/162 |
| 3,556,588 | 1/1971 | Monyer et al. | 297/162 |
| 3,583,760 | 6/1971 | McGregor | 297/155 X |
| 4,511,178 | 4/1985 | Brennan | 297/146 |
| 4,668,010 | 5/1987 | Fujiwara . | |
| 4,685,726 | 8/1987 | Wolpert, Jr. | 297/155 X |
| 4,733,908 | 3/1988 | Dykstra et al. . | |
| 4,779,884 | 10/1988 | Minati | 297/155 X |
| 4,907,775 | 3/1990 | Lorence et al. | 248/311.2 |
| 5,000,511 | 3/1991 | Shichijo et al. . | |
| 5,169,209 | 12/1992 | Beroth | 297/146 |
| 5,290,092 | 3/1994 | Geer . | |
| 5,295,650 | 3/1994 | Brandt | 248/311.2 |
| 5,320,406 | 6/1994 | North . | |

*Primary Examiner*—Peter M. Cuomo
*Assistant Examiner*—Stephen Vu
*Attorney, Agent, or Firm*—Howell & Haferkamp, L.C.

[57] ABSTRACT

An airplane seat assembly comprises an airplane seat and a beverage cup holder. The airplane seat is configured to be mounted in an airplane cabin in side-by-side relationship with another similar seat. The airplane seat comprises a seat portion and a back portion extending up from the seat portion. The beverage cup holder has a holder body shaped and configured for holding at least one beverage container. The holder body is operatively connected to the airplane seat for pivotal movement between a stowed position in which the holder body is positioned adjacent a side of the back portion of the airplane seat and a use position in which the holder body extends generally rearwardly from the back portion of the airplane seat. The holder body is configured to support a beverage container when the holder body is in its use position.

17 Claims, 3 Drawing Sheets

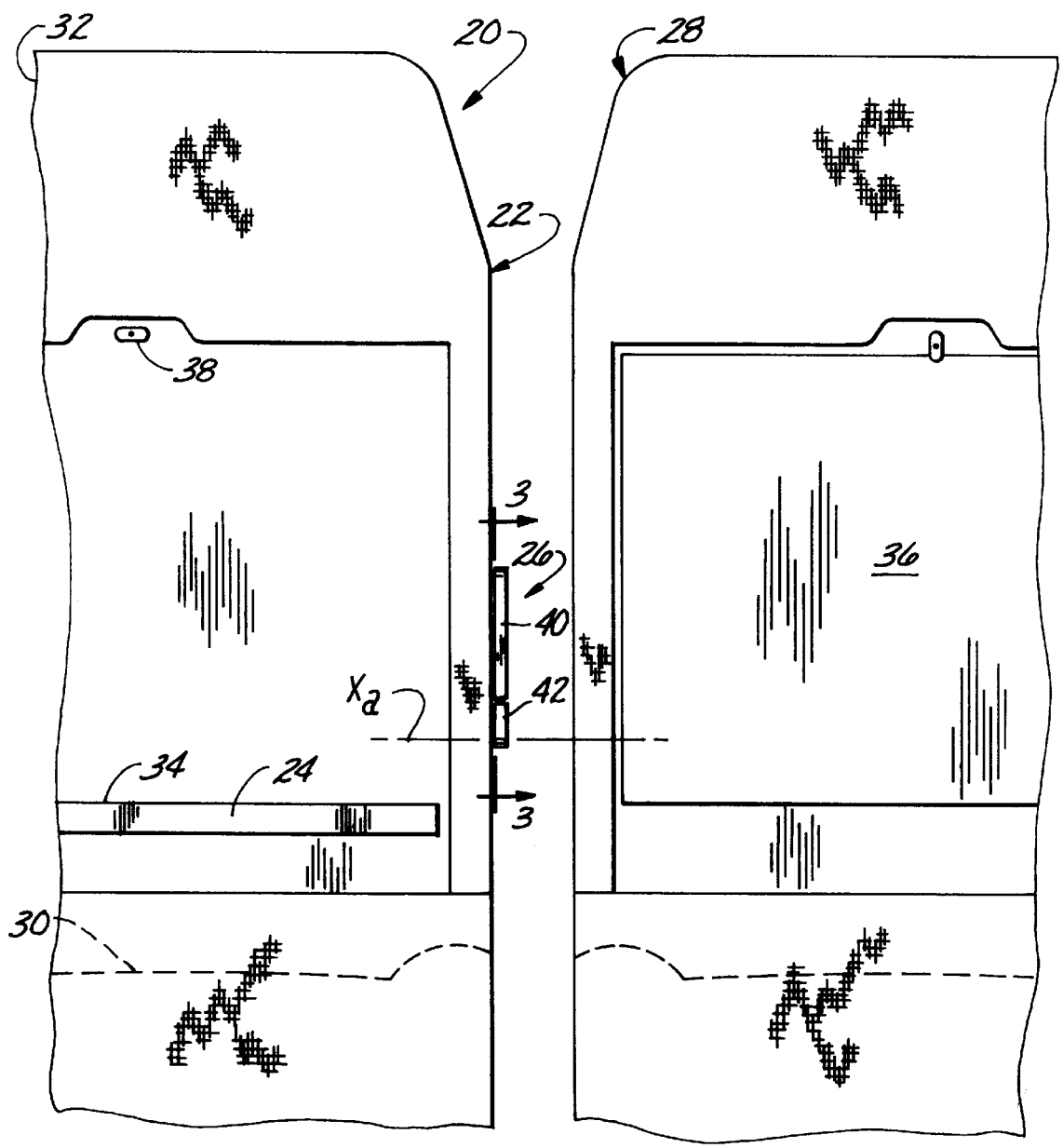

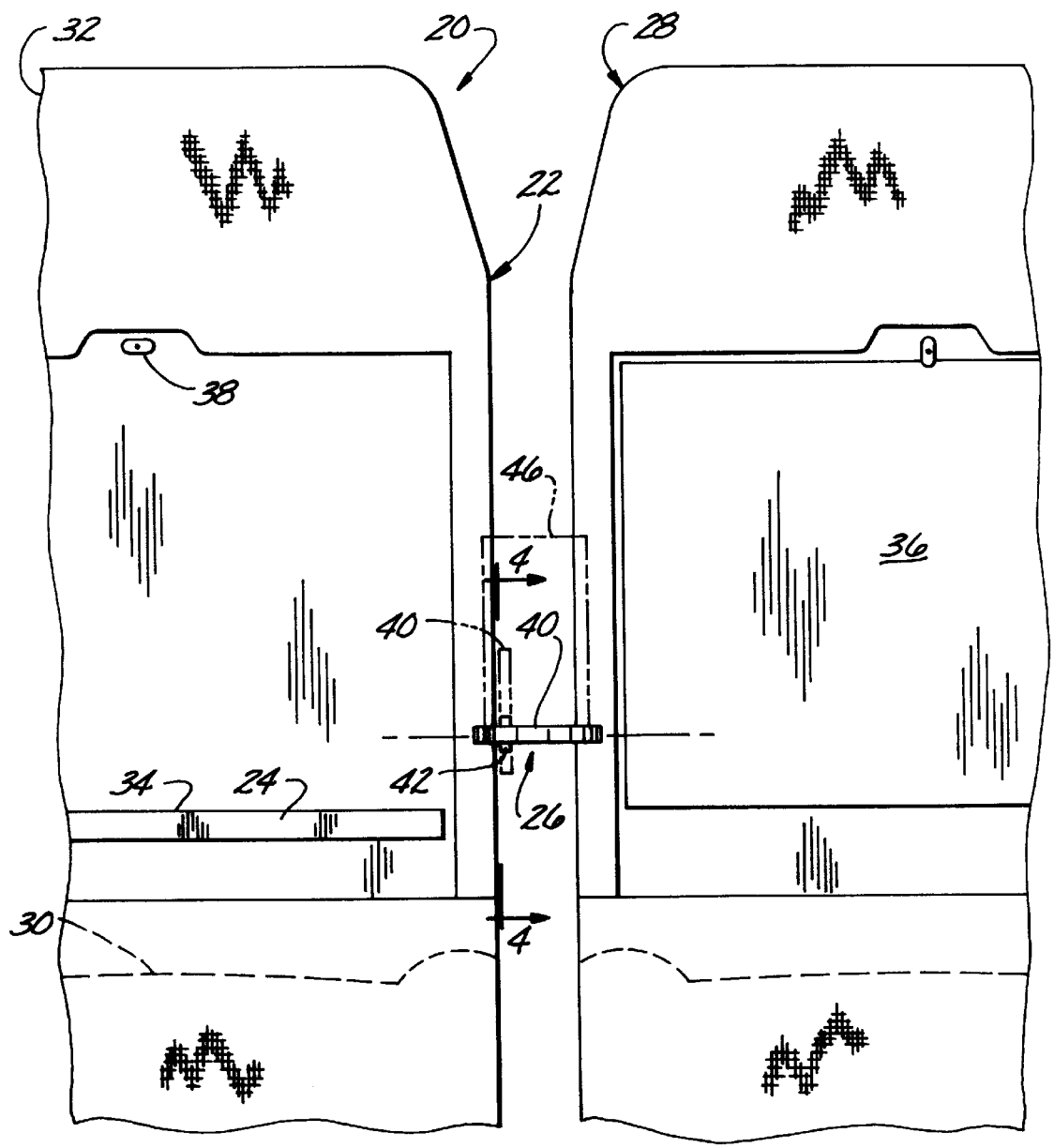

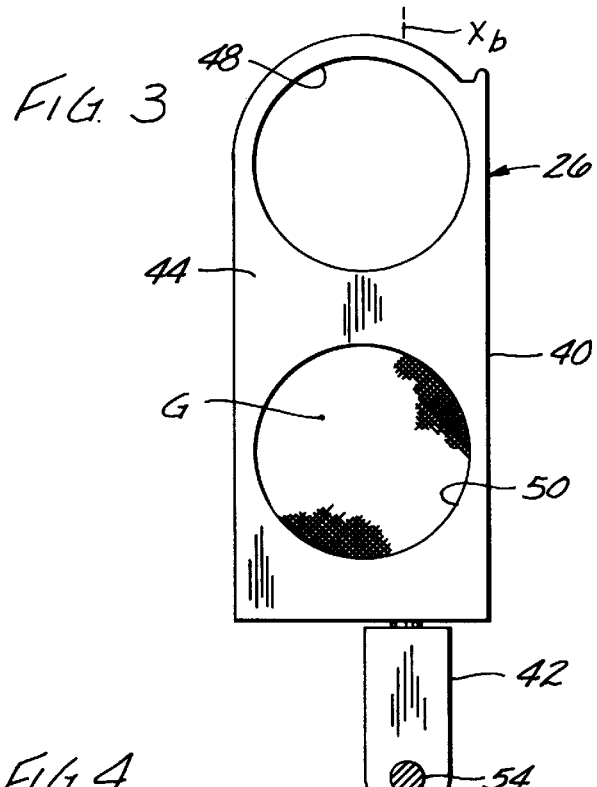
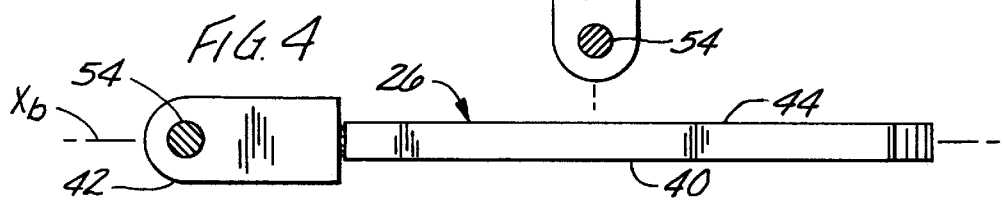
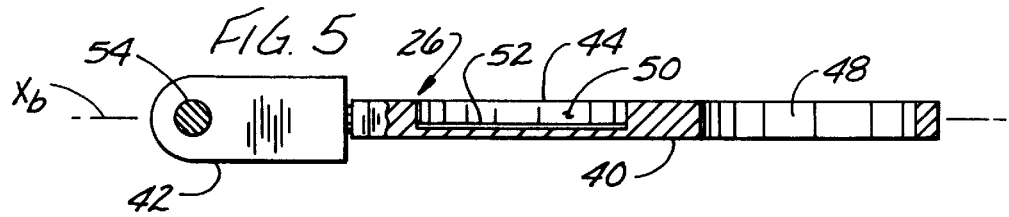
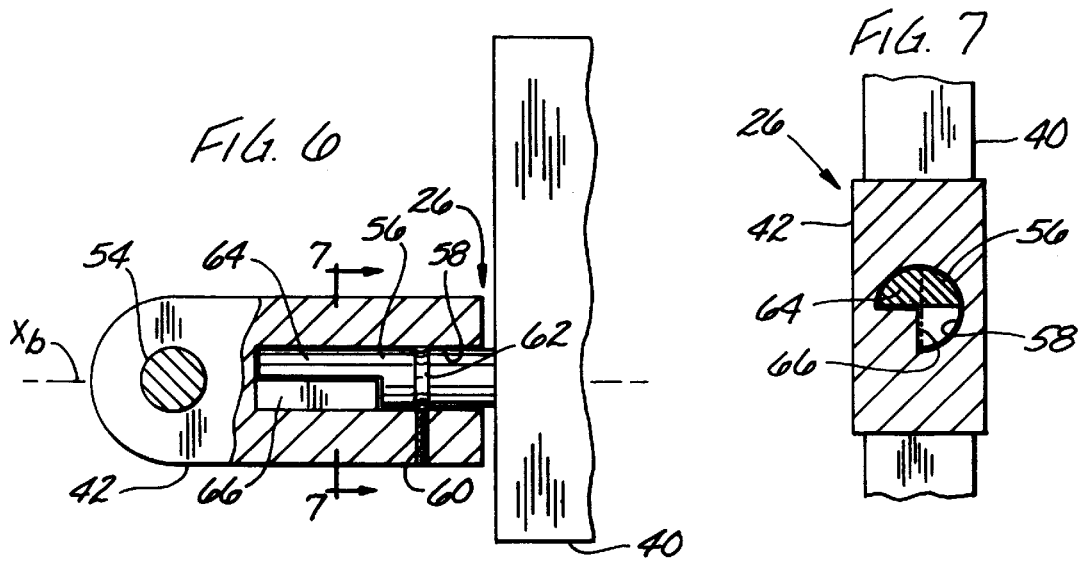

AIRPLANE SEAT ASSEMBLY HAVING BEVERAGE CUP HOLDER

BACKGROUND OF THE INVENTION

This invention relates to airplane seat assemblies and, more particularly, airplane seat assemblies having beverage cup holders.

A conventional airliner has many rows of seat assemblies. A typical airplane seat assembly includes an airplane seat and a tray table. The airplane seat includes a seat portion, and a back portion extending up from the seat portion. The tray table is pivotally connected to the seat via pivot arms for pivotal movement of the tray table between a stowed position and a use position. The tray table is moved between its stowed position and its use position by a person sitting in a seat behind the airplane seat assembly. When the tray table is in its use position, its upper surface is generally horizontal and is spaced rearward of the back portion of the airplane seat. When the tray table is in its stowed position, its upper surface is adjacent to and facing the back portion of the airplane seat.

A disadvantage associated with conventional airplane seat assemblies is that the tray table is the only viable place for holding a beverage cup. The tray table is of limited size and therefore there is often insufficient surface area to support both a food tray and a beverage cup. Also, passengers frequently use the tray tables as work areas for supporting reading or writing materials, or personal computers. Because of the limited area of the tray table, a passenger generally cannot support a beverage on the tray table while using the tray table as a work area. Thus, the passenger must generally remove his or her work materials from the tray table if he or she desires a beverage, or risk having the beverage spill on the materials. Moreover, many passengers deem their passenger compartments to be somewhat confining when the tray table is in its use position, because the tray table limits the degree to which one can shift or move within the compartment. For example, it is difficult for passengers to cross their legs when their tray tables are in their use position. Thus, if the passenger desires to maximize the space of the passenger compartment while drinking a beverage, he or she must generally hold the beverage and keep the tray table in its stowed position.

SUMMARY OF THE INVENTION

Among the several objects of the present invention may be noted the provision of an improved seat assembly; the provision of such a seat assembly which overcomes the disadvantages of conventional airplane seats; the provision of such a seat assembly for use in an airplane; the provision of such a seat assembly which holds a passenger's cup or other beverage container without interfering with the passenger's use of the table tray; the provision of such a seat assembly which holds a passenger's cup independent of the table tray; and the provision of such a seat assembly which is of relatively simple construction.

Generally, an airplane seat assembly of the present invention comprises an airplane seat and a beverage cup holder. The airplane seat is configured to be mounted in an airplane cabin in side-by-side relationship with another similar seat. The airplane seat comprises a seat portion and a back portion extending up from the seat portion. The beverage cup holder has a holder body shaped and configured for holding at least one beverage container. The holder body is operatively connected to the airplane seat for pivotal movement between a stowed position in which the holder body is positioned adjacent a side of the back portion of the airplane seat and a use position in which the holder body extends generally rearwardly from the back portion of the airplane seat. The holder body is configured to support a beverage container when the holder body is in its use position.

Other objects and features will be in part apparent and in part pointed out hereinafter.

BRIEF DESCRIPTION OF THE DRAWINGS

FIG. 1 is a fragmented rear elevational view of an airplane seat assembly of the present invention having an airplane seat and a beverage cup holder, the beverage cup holder being shown in a stowed position, the airplane seat assembly being in side-by-side relationship with another similar seat;

FIG. 2 is a fragmented rear elevational view similar to that of FIG. 1 but showing the beverage cup holder in its use position for supporting a beverage cup;

FIG. 3 is a cross-sectional view taken along the plane 3—3 of FIG. 1 showing a side view of the beverage cup holder in its stowed position, and showing a holder body and pivot arm of the beverage cup holder;

FIG. 4 is a cross-sectional view taken along the plane 4—4 of FIG. 2 showing a side view of the beverage cup holder in its use position;

FIG. 5 is a cross-sectional view similar to FIG. 4, but with portions broken away to show details of the beverage cup holder;

FIG. 6 is an enlarged fragmented view of the beverage cup holder of FIGS. 3–5 showing the connection of the holder body to the pivot arm; and FIG. 7 is a cross-sectional view taken along the plane 7—7 of FIG. 6.

Corresponding reference characters indicate corresponding parts throughout the several views of the drawings.

DESCRIPTION OF THE PREFERRED EMBODIMENT

Referring now to the drawings, and first more particularly to FIGS. 1 and 2, an airplane seat assembly of the present invention is indicated in its entirety by the reference numeral 20. The airplane seat assembly 20 comprises an airplane seat, generally indicated at 22, a tray table 24, and a beverage cup holder, generally indicated at 26.

The airplane seat is configured to be mounted in an airplane cabin in side-by-side relationship with another similar seat, such as seat 28 shown in FIGS. 1 and 2. The airplane seat 22 is preferably of conventional design and comprises a seat portion 30 and a back portion 32 extending up from the seat portion. The tray table 24 is preferably of conventional design and is operatively connected to the airplane seat 22 for pivotal movement of the tray table between a stowed position and a use position. The tray table 24 has an upper surface 34 for supporting articles placed on the tray table. The tray table 24 is configured such that its upper surface 34 is generally horizontal and extends rearwardly from the back portion 32 of the airplane seat 22 when the tray table is in its use position. The tray table 24 is further configured such that its upper surface 34 is adjacent to and facing the back portion 32 of the airplane seat 22 when the tray table is in its stowed position. The tray table 24 is shown in its use position in FIGS. 1 and 2. Another identical tray table 36 connected to the other (adjacent) seat 28 is shown in its stowed position in FIGS. 1 and 2. Preferably, a turn lock 38 is rotatably connected to the back portion 32 of the seat 22 to releasably lock the tray table in its stowed position.

Referring now to FIGS. 1–5, the beverage cup holder 26 includes a holder body 40 and a pivot arm 42 operatively connecting the cup holder to the airplane seat 22. The holder body 40 has a cup receiving face 44 (FIG. 3) shaped and configured for holding two beverage containers or cups, one of which is indicated in phantom at 44 in FIG. 2. The cup receiving face 44 is generally flat. First and second cup receiving openings 48, 50 are within the holder body 40. The first cup receiving opening 48 extends through the holder body 40 and has a generally circular rim at the cup receiving face 44 sized and configured for receiving and holding a beverage cup or other types of containers, e.g., cans or bottles. The second cup receiving opening 50 is a cup receiving recess formed in the cup receiving face 44 and has a generally circular rim at the cup receiving face 44 sized and configured for receiving a beverage container. Preferably, a non-skid pad 52 (FIG. 5) made of a rubber-like polymeric sheet material is positioned within the cup receiving recess 50 and bonded to the holder body 40 for resisting sliding of a beverage cup supported within the cup receiving recess.

The pivot arm 42 of the cup holder 26 is pivotally connected to a side of the back portion 32 of the seat 22 via a pivot pin 54. Preferably, the pivot arm 42 is pivotable relative to the airplane seat 22 along a generally horizontal axis $X_a$ between a retracted position (shown in FIG. 1) and an extended position (shown in FIG. 2). In its retracted position, the pivot arm 42 is in a generally vertical orientation and extends along a side of the back portion 32 of the airplane seat 22. In its extended position, the pivot arm is in a generally horizontal orientation and extends rearwardly from the back portion 32 of the airplane seat. Although not shown, it is to be understood that the pivot pin 54 includes a suitable stop to prevent the pivot arm 42 from pivoting down below its extended position.

Referring now to FIGS. 3–7, the holder body 40 of the cup holder 26 and the pivot arm 42 are pivotally connected together with a short shaft 56. The short shaft 56 is fixed to and extends from an end of the holder body 50. The pivot arm 42 has a bore 58 therein sized for rotatably receiving the shaft 56. The shaft 56 is rotatable in the bore 58 of the pivot arm 42 about an offset longitudinal axis $X_b$ of the holder body 40. A set screw 60 is screwed into the pivot arm 42 and extends into a circumferential groove 62 of the shaft 56 to prevent the shaft from moving longitudinally along the longitudinal axis $X_b$. As shown in FIGS. 6 and 7, the shaft 56 has a semi-cylindrically shaped end 64, and the pivot arm 42 has a stop 66 within the bore 58 to limit the extent to which the shaft can rotate or pivot along the axis $X_b$. Because of the shaft 56 and stop 66, the holder body 40 is pivotable relative to the pivot arm 42 about the longitudinal axis $X_b$ between a turned position (shown in FIGS. 3, 6 and 7) and a cup supporting position (shown in FIGS. 2, 4 and 5). The cup receiving face 44 of the holder body 40 faces upwardly when the holder body is in its cup supporting position and faces laterally (e.g., to the left as viewed in FIG. 1) when the holder body is in its turned position. Preferably, the longitudinal axis $X_b$ of the holder body 40 is spaced laterally from the gravitational center G of the holder body so that gravity tends to urge the holder body to its cup supporting position.

In operation, the cup holder 26 is initially in a stowed position (FIG. 1) in which the pivot arm 42 is in its retracted position and the holder body is in its turned position. A latch member (not shown) is preferably attached to the side of the back portion 32 of the seat for releasably holding the cup holder 26 in its stowed position. In its stowed position, the cup holder 26 is preferably between the side-by-side seats 22 and 28 and does not extend rearwardly of the rear surface of the back portion 32. Thus, the cup holder 26 does not extend rearwardly into the passenger's seating compartment when the cup holder is in its stowed position. To use the cup holder 26, the pivot arm 42 is pivoted downward to its extended position (shown in FIG. 2) in which the short shaft 56 and longitudinal axis $X_b$ of the holder body 40 are generally horizontally positioned. Because of the offset of longitudinal axis $X_b$ from the holder body's gravitational center G, gravity automatically urges the holder body 40 from its turned position (shown in phantom in FIG. 2) to its cup supporting position (shown in solid in FIG. 2). Thus, when the cup holder 26 is in its use position, the pivot arm 42 is in its extended position and the holder body 40 is in its cup supporting position.

As shown in FIGS. 1 and 2, the cup holder 26 may be operated independently of the tray table 24. In other words, the cup dispenser 26 may be in either of its use or stowed positions when the tray table 24 is in either of its use or stowed positions. Also, because of the location of the cup holder 26 relative to the airplane seat 22 and tray table 24, it may hold a beverage cup without interfering with the passenger's use of the table tray.

Although the seat assembly 20 is primarily intended to be used as an airplane seat assembly, it is to be understood that a seat assembly of the present invention may be used in other vehicles without departing from the scope of this invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An airplane seat assembly comprising an airplane seat, a beverage cup holder, and a tray table, the airplane seat being adapted to be mounted in an airplane cabin in side-by-side relationship with another similar seat, the airplane seat comprising a seat portion and a back portion extending up from the seat portion, the beverage cup holder having a holder body shaped and adapted for holding at least one beverage container, the holder body being operatively connected to the airplane seat for pivotal movement between a stowed position in which the holder body is positioned adjacent a side of the back portion of the airplane seat and a use position in which the holder body extends generally rearwardly from the back portion of the airplane seat, the holder body being adapted to support a beverage container when the holder body is said use position, the tray table being operatively connected to the airplane seat for pivotal movement of the tray table between a stowed position and a use position, the tray table having an upper surface, the tray table being configured such that said upper surface is generally horizontal and extends rearwardly from the back portion of the airplane, seat when the tray table is in said use position, the tray table further being configured such that said upper surface is adjacent to and facing the back portion of the airplane seat when the tray table is in said stowed position.

2. An airplane seat assembly as set forth in claim 1 wherein the holder body is pivotally connected to the back portion of the airplane seat via a pivot arm, the pivot arm being pivotally moveable relative to the airplane seat about a horizontal axis between a retracted position and an extended position when the back portion is in a generally vertical position, the pivot arm being in its retracted position when the holder body is in said stowed position and being in said extended position when the holder body is in said use position.

3. An airplane seat assembly as set forth in claim 2 wherein the holder body has a cup receiving face, the holder body being pivotally connected to the pivot arm for rotation of the holder body relative to the pivot arm about a longitudinal axis of the holder body between a cup supporting position and a turned position, the cup receiving face facing upwardly when the holder body is in said cup supporting position and facing laterally when the holder body is in said turned position, the holder body being in said use position when the pivot arm is in its extended position and the holder body is in said cup supporting position, the holder body being in said stowed position when the pivot arm is in said retracted position and the holder body is in said turned position.

4. An airplane seat assembly as set forth in claim 3 wherein the cup receiving face is generally flat.

5. An airplane seat assembly as set forth in claim 4 wherein the holder body has a generally circular rim at said cup receiving face sized and adapted for receiving a beverage container.

6. An airplane seat assembly as set forth in claim 5 wherein the rim is the periphery of a cup receiving hole extending through the holder body.

7. An airplane seat assembly as set forth in claim 5 wherein the rim is the periphery of a cup receiving recess formed in the cup receiving face of the holder body.

8. An airplane seat assembly as set forth in claim 3 wherein the holder body is pivotally connected to the pivot arm for rotation of the holder body relative to the pivot arm about an axis spaced from the holder body's center of gravity.

9. An airplane seat assembly comprising an airplane seat and a beverage cup holder, the airplane seat being adapted to be mounted in an airplane cabin in side-by-side relationship with another similar seat, the airplane seat comprising a seat portion and a back portion extending up from the seat portion, the beverage cup holder having a holder body shaped and adapted for holding at least one beverage container, the holder body being operatively connected to the airplane seat for pivotal movement between a stowed position in which the holder body is positioned adjacent a side of the back portion of the airplane seat and a use position in which the holder body extends generally rearwardly from the back portion of the airplane seat, the holder body being adapted to support a beverage container when the holder body is in its use position, the holder body being pivotally connected to the back portion of the airplane seat via a pivot arm, the pivot arm being pivotally moveable relative to the airplane seat about a horizontal axis between a retracted position and an extended position when the back portion is in a generally vertical position, the pivot arm being in said retracted position when the holder body is in said stowed position and being in said extended position when the holder body is in said use position.

10. An airplane seat assembly as set forth in claim 9 wherein the holder body has a cup receiving face, the holder body being pivotally connected to the pivot arm for rotation of the holder body relative to the pivot arm about a longitudinal axis of the holder body between a cup supporting position and a turned position, the cup receiving face facing upwardly when the holder body is in said cup supporting position and facing laterally when the holder body is in said turned position, the holder body being in said use position when the pivot arm is in said extended position and the holder body is in said cup supporting position, the holder body being in said stowed position when the pivot arm is in said retracted position and the holder body is in said turned position.

11. An airplane seat assembly as set forth in claim 10 wherein the longitudinal axis of the holder body is spaced from the holder body's center of gravity.

12. A vehicle seat assembly comprising a vehicle seat and a beverage cup holder, the vehicle seat being adapted to be mounted in a vehicle, the vehicle seat comprising a seat portion and a back portion extending up from the seat portion, the beverage cup holder having a holder body shaped and adapted for holding at least one beverage container, the holder body being operatively connected to the vehicle seat for pivotal movement between a stowed position in which the holder body is positioned adjacent a side of the back portion of the vehicle seat and a use position in which the holder body extends generally rearwardly from the back portion of the vehicle seat, the holder body being adapted to support a beverage container when the holder body is in said use position, the holder body being pivotally connected to the back portion of the vehicle seat via a pivot arm, the pivot arm being pivotally moveable relative to the vehicle seat about a horizontal axis between a retracted position and an extended position when the back portion is in a generally vertical position, the pivot arm being in said retracted position when the holder body is in said stowed position and being in said extended position when the holder body is in said use position, the holder body having a cup receiving face, the holder body being pivotally connected to the pivot arm for rotation of the holder body relative to the pivot arm about a longitudinal axis of the holder body between a cup supporting position and a turned position, the cup receiving face facing upwardly when the holder body is in said cup supporting position and facing laterally when the holder body is in said turned position, the holder body being in said use position when the pivot arm is in said extended position and the holder body is in said cup supporting position, the holder body being in said stowed position when the pivot arm is in said retracted position and the holder body is in said turned position.

13. A vehicle seat assembly as set forth in claim 12 wherein the longitudinal axis of the holder body is spaced from the holder body's center of gravity.

14. A vehicle seat assembly as set forth in claim 12 wherein the cup receiving face is generally flat.

15. A vehicle seat assembly as set forth in claim 12 wherein the holder body has a generally circular rim at said cup receiving face sized and configured for receiving a beverage container.

16. A vehicle seat assembly as set forth in claim 15 wherein the rim is the periphery of a cup receiving hole extending through the holder body.

17. A vehicle seat assembly as set forth in claim 15 wherein the rim is the periphery of a cup receiving recess formed in the cup receiving face of the holder body.

* * * * *